(12) United States Patent
Eul

(10) Patent No.: US 8,272,678 B2
(45) Date of Patent: Sep. 25, 2012

(54) SLIDING DOOR SYSTEM FOR A MOTOR VEHICLE

(75) Inventor: Werner Eul, Troisdorf (DE)

(73) Assignee: Tsubaki Kabelschlepp GmbH, Wenden (DE)

( * ) Notice: Subject to any disclaimer, the term of this patent is extended or adjusted under 35 U.S.C. 154(b) by 94 days.

(21) Appl. No.: 12/449,266

(22) PCT Filed: Feb. 14, 2008

(86) PCT No.: PCT/EP2008/051776
§ 371 (c)(1),
(2), (4) Date: Nov. 4, 2009

(87) PCT Pub. No.: WO2008/098981
PCT Pub. Date: Aug. 21, 2008

(65) Prior Publication Data
US 2010/0071268 A1 Mar. 25, 2010

(30) Foreign Application Priority Data
Feb. 16, 2007 (DE) .................... 20 2007 002 499 U

(51) Int. Cl.
*B60J 5/06* (2006.01)
(52) U.S. Cl. ..................................... 296/146.4
(58) Field of Classification Search ................ 296/146.4
See application file for complete search history.

(56) References Cited

FOREIGN PATENT DOCUMENTS

| | | |
|---|---|---|
| DE | 103 33 834 A1 | 8/2005 |
| EP | 1 010 558 A2 | 6/2000 |
| JP | 10-000936 | 1/1998 |
| JP | 11-093514 | 4/1999 |
| JP | 2003-239627 | 8/2003 |
| WO | WO 2005/090825 | 9/2005 |

OTHER PUBLICATIONS

English language Abstract, Translated Description and Claims of WO 2005/090825 A1, European Patent Office's esp@cenet.com database, 4pp.
English language Abstract, Translated Description and Claims of DE 103 33 834 A1, European Patent Office's esp@cenet.com database, 6pp.
English language Abstract of JP 11-093514, European Patent Office's esp@cenet.com database, 1p.
English language Abstract of JP 10-000936, European Patent Office's esp@cenet.com database, 1p.
English language Abstract JP 2003-239627, European Patent Office's esp@cenet.com database, 1p.
Notification of Transmittal of Translation of the International Preliminary Report on Patentability received Sep. 24, 2009, 1p.
English translation of International Preliminary Report on Patentability received Sep. 24, 2009, 8pp.

*Primary Examiner* — H Gutman
(74) *Attorney, Agent, or Firm* — Smith Law Office

(57) ABSTRACT

The invention relates to a sliding door system, comprising at least one sliding door, wherein a guide rail is provided in the vehicle body in the vicinity of the door opening. A guiding element can be displaced along the guide rail, the element being connected to the sliding door via a retaining arm. The sliding door system has a power conducting unit, which is formed by members connected to each other in an articulated manner for receiving and guiding at least one line, which extends from a stationary connection on a vehicle body to a connecting element. The power conducting unit can be displaced in the longitudinal direction of the guide rail. The guide rail overlaps the power conducting unit at least in some regions.

17 Claims, 4 Drawing Sheets

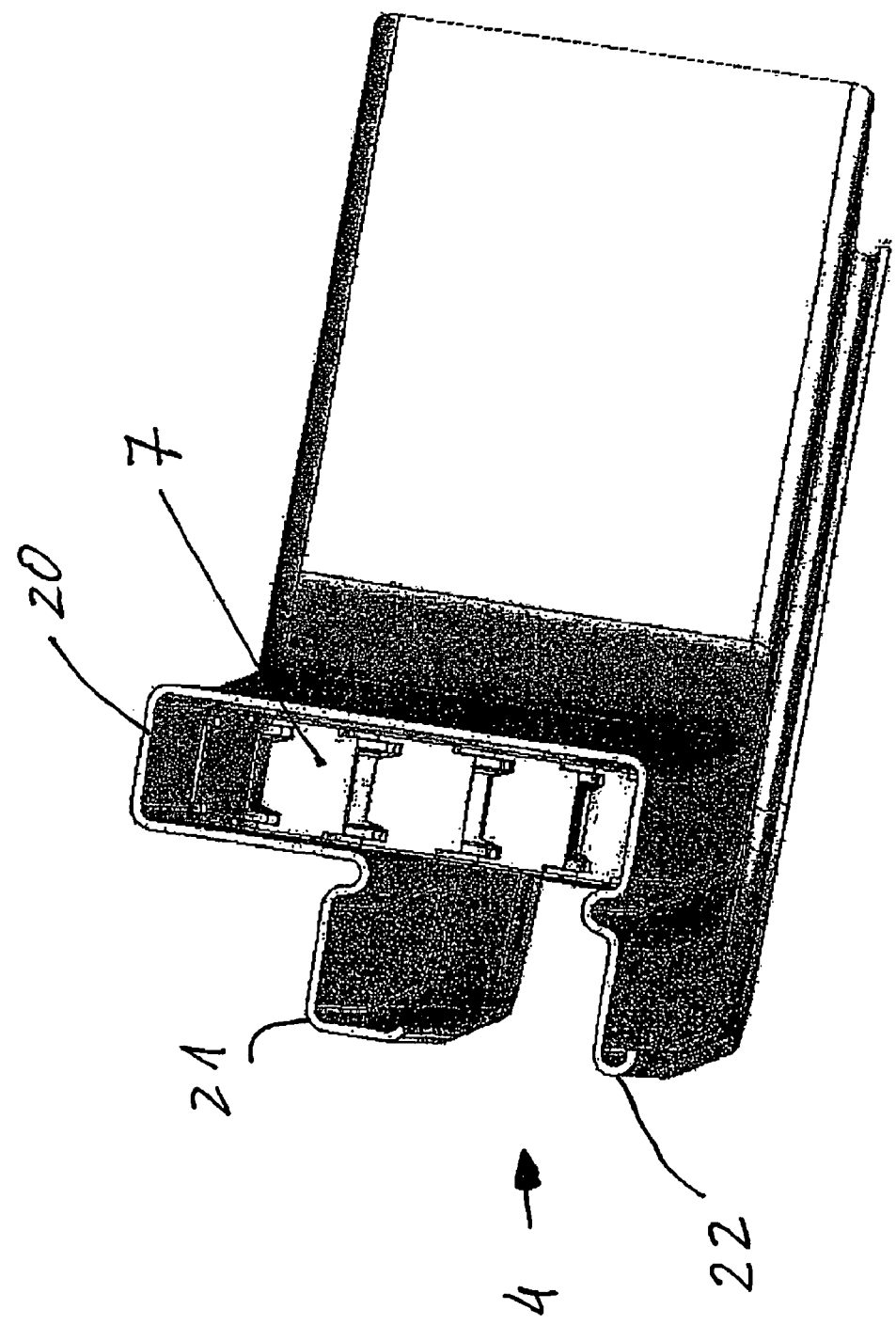

SLIDING DOOR SYSTEM FOR A MOTOR VEHICLE

FIELD AND BACKGROUND OF THE INVENTION

The invention relates to a sliding door system for a vehicle, in particular a motor vehicle.

Motor vehicles, in particular passenger vehicles, including, for example, vans or minivans, have gained great popularity in recent times. Owing to their structural configuration, such passenger vehicles have at least one sliding door through which easy access to the vehicle interior is possible.

Vans should provide a level of comfort comparable to that known from passenger vehicles. Components which may include, for example, electrically actuable window lifters, illuminating means, speaker boxes or a central locking system, should therefore be fitted into the sliding doors.

A sliding door system of this type is known from EP 1 010 558 A2. The sliding door here has, in its front region, i.e. the region directed toward the front of the vehicle, an upper and lower retaining arm on which a respective guide roller is mounted as a guide element. The guide rollers are movable in a guide rail on the vehicle body above the door opening or below the door opening. In order to move the sliding door out of the door opening during the opening operation and to move it into the door opening during the closing operation, the forwardly pointing ends of the guide rails are curved toward the vehicle interior.

As likewise revealed in the above-mentioned publication, a duct with a line-holding device guided therein is arranged on the side facing the door opening parallel to the lower guide rail for the roller mounted on the lower holder. The line-holding device is formed as a power-conducting unit from chain links connected pivotably to one another and is connected at one end to the sliding door and at the other end to a positionally fixed part of the vehicle body. The power-conducting unit has a curved region of interconnected chain links between both of its ends.

The energy-conducting unit mentioned here serves to hold and guide lines from a terminal on the vehicle body to a terminal on the lower retaining arm of the sliding door in order to supply various electric devices arranged in the sliding door with electric power, as already described.

A further arrangement of a sliding door system is known from WO 2005/090825. The guide rail and guide device here are arranged on the outside of or in the vehicle body in the region over which the sliding door is moved during the opening and closing operations. The retaining arm for the sliding door is arranged in the rear end region of the sliding door, i.e. the region directed in the vehicle rear.

Furthermore, said publication discloses a sliding door system in which the line-holding device is integrated in the guide rail for the guide element of the sliding door.

The previously known sliding door systems have one difference over the pivotable door systems known from passenger vehicles. In the case of pivotable door systems, the electric lines are substantially covered to the outside by the door panel or the pillar or wing panel and are therefore out of reach from the outside when the door is closed or else when the door is open.

SUMMARY OF THE INVENTION

The present invention is based on the object of providing a sliding door system in which the power-conducting line is substantially inaccessible from the outside when the door is closed and optionally also when the door is open.

The sliding door system according to the invention has at least one sliding door with a guide rail which can be fitted on or in the vehicle body in the vicinity of the door opening, and furthermore a guide element which is movable along the guide rail and is connected to the sliding door via a retaining arm, and a power-conducting unit which is formed from links which are connected to one another in an articulated manner and are intended for receiving and guiding at least one line which extends from a positionally fixed terminal on a vehicle body to a terminal element. The power-conducting unit is movable in the longitudinal direction of the guide rail.

In the case of the sliding door system according to the invention, it is furthermore provided that the guide rail at least partially overlaps the power-conducting unit. The overlap protects the lines guided in the power-conducting unit against unauthorized access from outside the vehicle when the door is closed or else when the door is open. The arrangement of the power-conducting unit within the sliding door system can furthermore be realized in such a manner that entry of dirt or dust particles or moisture into the power-conducting unit and therefore corrosion of the power-conducting lines can be prevented or at least minimized.

The sliding door system preferably has a retaining arm which is connected to the sliding door and to the guide element. In the case of sliding door systems which have guide rails which are curved toward the vehicle interior at their ends pointing forward, the particular connection can also be designed to be pivotable so that the additional pivoting of the door can be compensated for via the sliding door system. Furthermore, in the sliding door system according to the invention, the guide rail is of channel-shaped design and has a first opening which extends in the longitudinal direction of the guide rail.

The retaining arm which, for its part, is fastened to the sliding door extends through said first opening. The retaining arm is connected within the guide rail to the guide element which has at least one roller which is arranged on the channel-shaped guide rail in a manner such that it can rotate about an axis. The guide element can also have a plurality of rollers which permit support in a plurality of different directions and therefore ensure stable guidance. In particular, the retaining arm and guide element can also be designed as a single part, thus enabling additional connecting elements to be spared.

According to a further advantageous refinement, the retaining arm can also be of multi-part design, preferably with a pivoting element, such that the guide element and retaining arm, and retaining arm and sliding door are connected to each other fixedly, and in particular not pivotably, but the pivotability can be ensured via a pivoting element between the retaining arm elements.

The sliding door system according to the invention can have a second opening in the guide rail along the path of movement of the guide element, with a connecting element which is connected to the guide element and/or the retaining arm extending through said second opening.

According to a further advantageous configuration of the invention, said second opening has a seal.

Said second opening in the guide rail may be omitted by means of embodiments of the sliding door system which are likewise according to the invention. The connecting element extends through the first opening in the guide rail and is connected within the guide rail to the guide element and/or retaining arm.

According to a further advantageous configuration of the invention, the connecting element and retaining arm are connected to each other outside the guide rail, with it also being possible to dispense with the second opening.

The connecting element is connected on one side to the terminal element of the power-conducting unit and on the other side to the guide element, which is movable in the guide rail, and/or to the retaining arm. According to an advantageous refinement of the invention, these connections can each be of pivotable design.

According to a further advantageous configuration of the invention, the terminal element is connected to the guide element and/or to the retaining arm, with it being possible for each of these connections to be of pivotable design.

The individual components of the sliding door system according to the invention are designed in such a manner that the electric devices of the sliding door are connected to the at least one power-conducting line which emerges from the power-conducting unit and is connected via the terminal element, and, if appropriate, via the connecting element and/or the guide element, and finally via the retaining arm to the sliding door.

The sliding door system according to the invention is characterized in that the power-conducting unit is arranged in a guide device, with the guide device likewise being designed as an elongate guide housing in which two substantially opposite longitudinal sides each guide outwardly facing sides of the strands of the power-conducting unit. In this case, guides can also be provided on the longitudinal sides of the housing, said guides ensuring that the power-conducting chain slides along with little friction and in a manner substantially free from wear.

The guide device can be designed in the form of an assembly with the guide rail or the vehicle body, thus enabling additional connecting elements to be spared. According to a further advantageous refinement of the invention, the guide device can also be formed by the outer wall of the vehicle body and the adjacently arranged guide rail such that this additional component is spared.

An advantageous configuration of the sliding door system according to the invention is characterized in that the guide device is connected releasably to the guide rail. Such a refinement of the guide device results in more degrees of freedom for the designer when designing the individual components of the sliding door system.

A further advantageous refinement of the sliding door system according to the invention is characterized in that the guide device is arranged at a distance from the guide rail. In particular spatial restrictions can therefore be more flexibly circumvented.

According to a further advantageous refinement, the sliding door system according to the invention can be completely preassembled and installed on the vehicle or removed therefrom as such a unit, if appropriate together with the sliding door. This is a substantial structural advantage in particular from the aspect of mass production of motor vehicles.

In the direction of movement of the guide element, the guide device has a gap through which the connecting element extends. Said gap preferably also has a seal which in particular protects the power-conducting unit from the penetration of dirt and dust particles or moisture and therefore minimizes the wear of the power-conducting chain.

According to a particularly advantageous configuration of the sliding door system according to the invention, the guide rail completely covers the gap of the guide device toward the vehicle exterior such that the power-conducting chain and the electric lines conducted therein are not accessible from the vehicle exterior. Thus, firstly, an entry of dirt into the guide device of the power-conducting chain is minimized and, secondly, manipulation of the electric line due to unauthorized access from the outside is made impossible.

Further advantages and details of the invention are explained with reference to the exemplary embodiments illustrated in the drawing without the subject matter of the invention being restricted to said specific exemplary embodiments.

BRIEF DESCRIPTION OF THE DRAWINGS

FIG. 6 shows schematically and in section a view of the guide rail with a channel and a power-conducting unit.

DETAILED DESCRIPTION OF THE PREFERRED EMBODIMENTS

Figure 1:
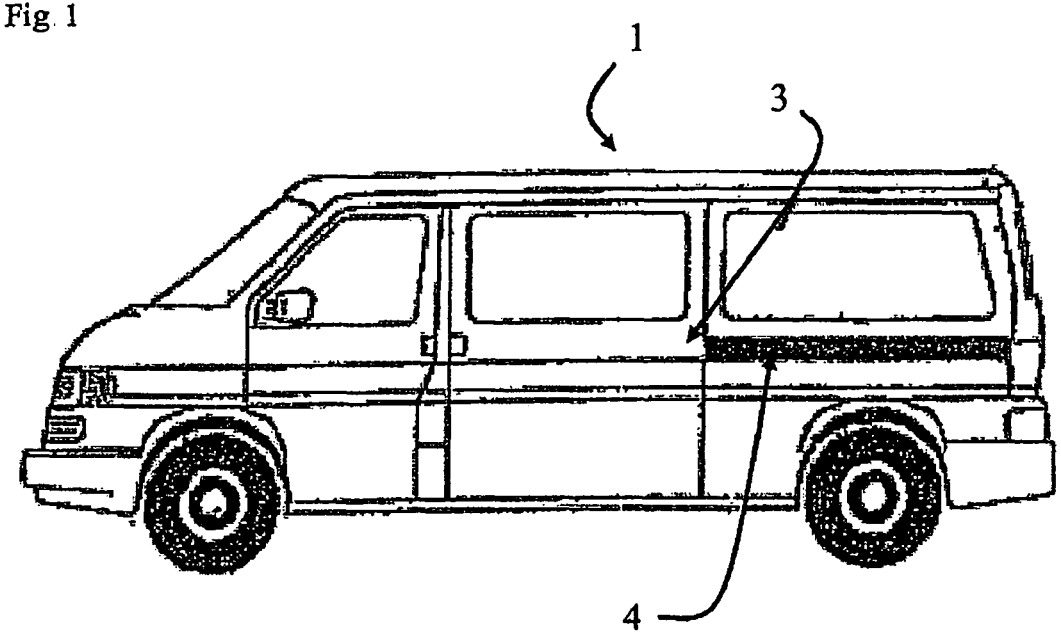
FIG. 1 shows schematically a vehicle with a sliding door system according to the invention.

FIG. 1 shows schematically a vehicle with a sliding door system according to the invention, with the embodiment being shown here with a centrally arranged guide rail 4 in which the retaining arm 6 is fastened to the rear part of the sliding door 3. In this case, the guide rail 4 is visible over virtually its entire length when the sliding door 3 is closed. The inwardly curved region of the guide rail 4 is at least partially covered here by the closed sliding door 3.

Figure 2:
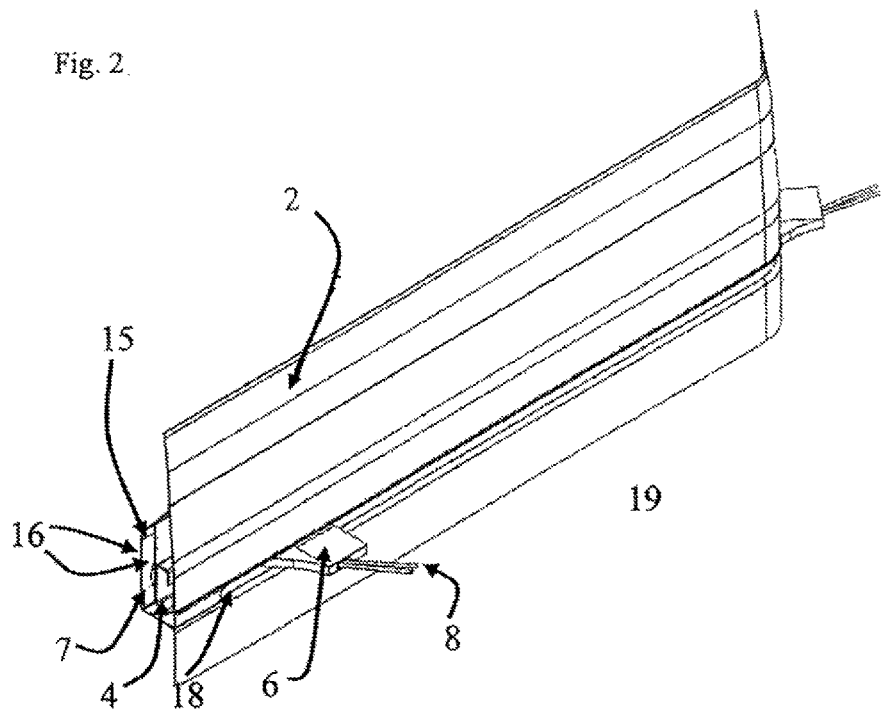
FIG. 2 shows schematically a perspective view of that part of a sliding door system according to the invention which is on the vehicle.

FIG. 2 shows schematically a perspective view of the sliding door system on or within the vehicle body 2. The guide rail 4 is partially covered by the vehicle body 2, with the retaining arm 6 extending through the gap in the outer wall of the vehicle body toward the sliding door 3 (not illustrated). The power-conducting lines 8 which are guided to the sliding door 3 via the retaining arm 6 are visible. In this case, the retaining arm 6 is either connected fixedly to the sliding door 3 or has a pivoting element (not illustrated) via which it is connected by a second part of the retaining arm 6 to the sliding door 3 in such a manner that the movement of the sliding door 3 along the guide rail 4, which is curved inward in the vicinity of the door cutout, is compensated for. According to an advantageous refinement of the invention, the lines 8 are surrounded by the retaining arm 6 and are therefore not accessible from the outside. The power-conducting unit 7 is arranged in the guide device 15 and is guided here by the mutually opposite longitudinal sides 16. The longitudinal sides 16 can have additional elements which can minimize the friction which occurs during the dynamic movement of the power-conducting unit 7 by actuation of the sliding door 3. Wear of the power-conducting unit 7 and corrosion of the longitudinal sides 16 due to abrasion can therefore be avoided. The connection between the retaining arm 6 and the power-conducting unit 7 can be configured in such a manner that it lies above or below the guide rail 4. There is also the possibility of the guide rail being of two-part design with a slot being formed such that the connection between the retaining arm and the power-conducting unit extends through the slot of the guide rail.

FIG. 2 furthermore shows the guide rail 4 with adjacently arranged guide device 15 in which the power-conducting unit 7 is held. In the embodiment shown of the sliding door system, the guide rail does not have a second opening 13. The power-conducting lines 8 are guided out of the power-conducting unit 7 via a terminal element 10 and a connecting element 14 and to the retaining arm 6 through the gap 18 between the guide rail 4 and guide device 15. In this case, the guide rail 4 covers the guide device 15 to the outside.

Figure 3:
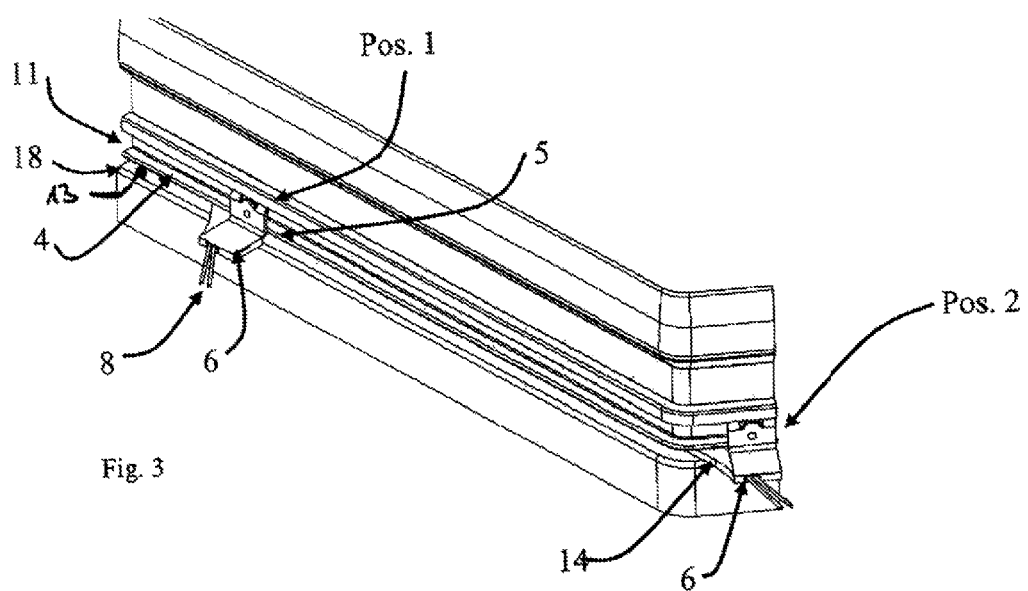
FIG. 3 shows schematically a perspective view of the sectioned guide rail.

In FIG. 3, the outer wall of the vehicle body 2 has been cut away and the guide rail 4 exposed. FIG. 2 schematically shows a perspective view of the sliding door system 1 according to the invention, with the retaining arm 6 here incorporating the function of the guide element 5. The retaining arm 6 is shown in two positions, when the door is open (Pos. 1) and when the door is closed (Pos. 2). The retaining arm 6 extends via the first opening 11 into the guide rail 4 and is supported there via rollers 12 by means of which it can move along the guide rail 4.

In the embodiment shown according to the invention, the guide rail 4 lies on the outside in front of the guide device 15 and, together with the latter, forms the gap 18 through which the connecting element 14 extends.

According to a further advantageous configuration of the sliding door system according to the invention, the guide rail 4 has a second opening 13 which is arranged, for example, lying opposite the first opening 11 which is illustrated in FIG. 2. In this case, the guide device 18 lies adjacent to or at a distance behind the guide rail 4 in such a manner that the guide device 15 is completely covered to the outside by the guide rail 4. The power-conducting unit 7 is arranged in the guide device 15, and the power-conducting lines 8 guided in said power-conducting unit extend via the terminal element 10 and the connecting element 14 to the guide element 5 and the retaining arm 6 and via the latter to the sliding door 3, with it being possible according to the invention for the retaining arm 6 to have the function of the guide element 5. The connecting element 14 extends through the gap 18 and the second opening 13 and connects terminal element 10 and guide element 5 or terminal element 10 and retaining arm 6.

According to a further advantageous configuration of the sliding door system according to the invention, the guide rail 4 has a second opening 13 which is arranged as desired within the guide rail 4, with the guide device 15 being arranged as desired with respect to the guide rail 4 such that a labyrinth connection is formed between the power-conducting unit and guide element 5, as a result of which accessibility from outside the vehicle to the power-conducting unit 7 is made substantially more difficult and also entry of dirt or moisture into the region of movement of the power-conducting unit 7 is minimized. The connecting element 14 can be designed as desired here, for example can be rod-shaped or bow-shaped, and is connected fixedly or pivotably to the terminal element 10 and guide element 5 or retaining arm 6.

In the abovementioned embodiments of the sliding door system according to the invention, the second opening 13 and/or the gap 18 have/has, in a particularly advantageous design, a seal which can additionally reduce the entry of dirt and moisture into the region of movement of the power-conducting unit 7.

Figure 4:
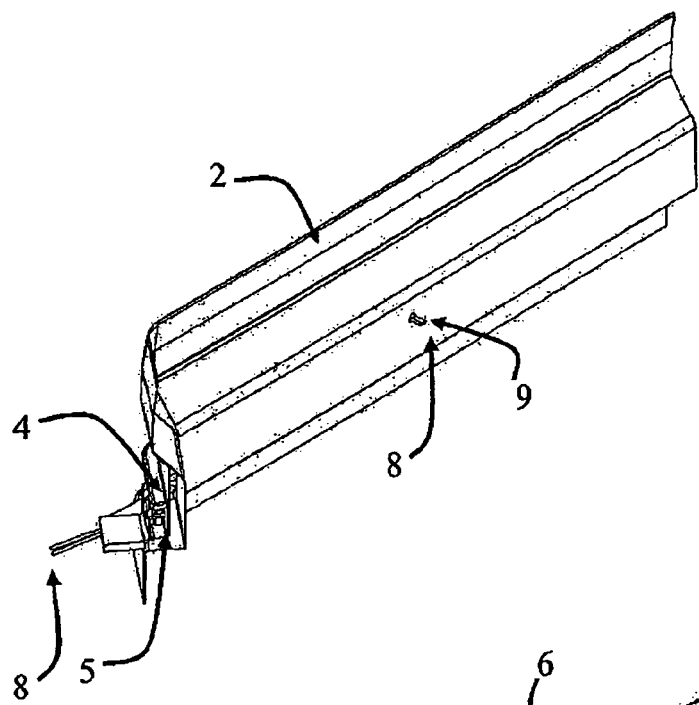
FIG. 4 shows schematically a perspective view of the implementation of the sliding door system according to the invention on the vehicle body.

FIG. 4 shows schematically in a perspective view that side of the sliding door system according to the invention which faces the vehicle, with it being possible for the wall element which forms the rear side of the sliding door system 1 to already be part of the vehicle body 2. The energy-conducting line 8 is connected to the vehicle electrics at the positionally fixed terminal 9. The retaining arm 6 is shown in the position of the sliding door 3 closed.

Figure 5:
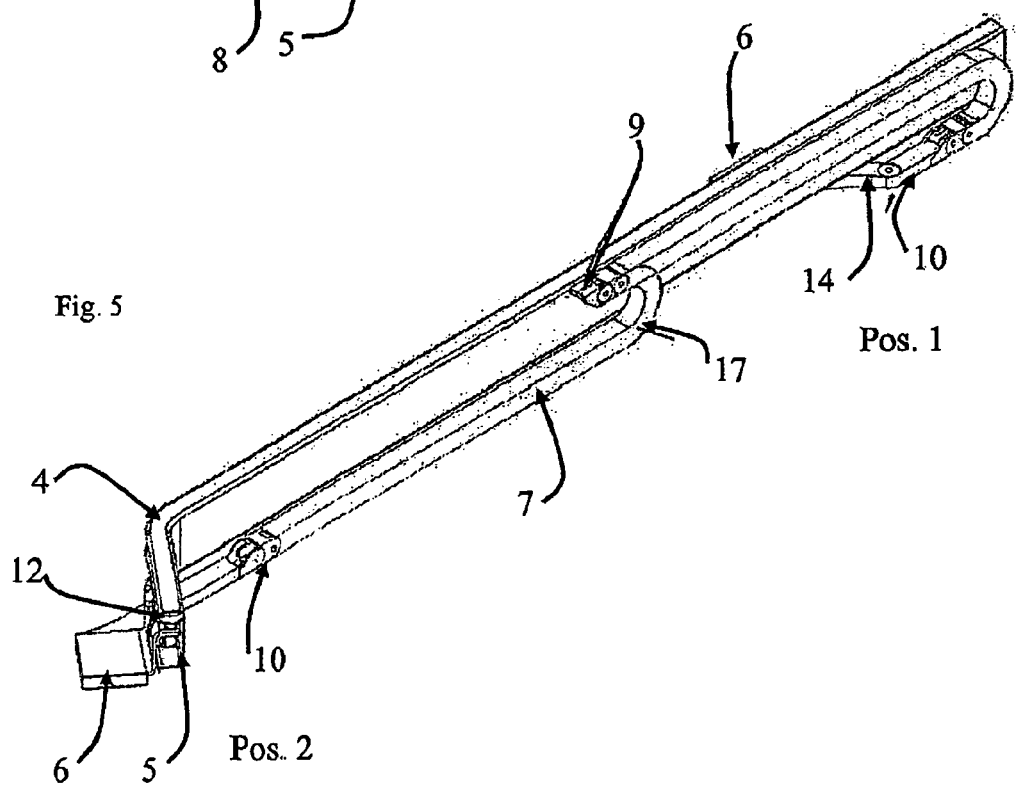
FIG. 5 shows schematically a perspective view of the guide rail and of the power-conducting unit.

FIG. 5 shows the position of the power-conducting unit 7 with respect to the guide rail 4 schematically in a perspective illustration. The power-conducting unit 7 extends from a positionally fixed terminal 9 to a terminal element 10 and is illustrated here in two positions, with the sliding door 3 open (Pos. 1) and closed (Pos. 2). The connecting element 14 is connected pivotally to the terminal element 10 and this compensates for the movement of the retaining arm 6 along the guide rail 4 which is curved inward in the front region. As a result, a further deflection of the power-conducting unit 7 is not required.

FIG. 6 shows an arrangement of the power-conducting unit and of the guide rail in cross section. The power-conducting unit 7 is guided in a channel 20. The channel 20 and the guide rail preferably form a constructional unit. The guide rail is formed by an upper part 21 and a lower part 22. The channel 20 and the guide rail 4 can be designed as a single piece. This is not absolutely necessary. There is also the option of them being of two-part design and being connected to each other by means of connecting means (not illustrated).

The guide rail and the power-conducting unit comprising a power-conducting chain and a guide for the power-conducting chain can form a constructional unit which is already preassembled. In this case, the lines, hoses or the like are also laid in the power-conducting chain. At the installation site, the constructional unit merely has to be connected to the vehicle body.

There is also the option of guiding the power-conducting unit in a guide channel. The guide channel is preferably configured in such a manner that it serves firstly to guide the power-conducting unit and secondly to protect the power-conducting unit. The guide channel can also be configured in such a manner that the noise formed during the movement of the power-conducting unit is at least reduced. The channel is preferably formed from plastic. If appropriate, said channel can have running surfaces which have an increased sliding characteristic, thus reducing the frictional forces between the power-conducting unit and the channel. The power-conducting unit can be arranged in such a manner that the strands run in a horizontal plane one above the other or next to each other.

The fixed point terminal of the power-conducting unit is preferably fixed within the interior of the channel.

The invention claimed is:

1. A sliding door system for a vehicle with a vehicle body having a door opening, said sliding door system comprising:
   a guide rail which can be fitted to the vehicle body in the vicinity of the door opening, wherein the guide rail is channel-shaped and defines a first opening and a second opening extending in the longitudinal direction of the guide rail;
   a sliding door joined to the guide rail for movement between an open position and a closed position, and the guide rail is at least partially visible from an exterior of the vehicle when the sliding door is in the closed position;
   a guide element movable along the guide rail and connected to the sliding door via a retaining arm extending through the first opening in the guide rail, and the guide element includes a roller operatively disposed in the guide rail first opening;
   a power-conducting unit including links connected to one another in an articulated manner for receiving and guiding at least one power-conducting line, the power-conducting unit extends from a positionally fixed terminal on the vehicle body to a terminal element, and wherein the power-conducting unit is movable in the longitudinal direction of the guide rail, and the guide rail at least partially covers the power-conducting unit from an outer side of the vehicle; and
a connecting element joined to the power-conducting unit and extending through the second opening in the guide rail.

2. The sliding door system of claim 1, wherein the retaining arm is connected pivotably to the sliding door.

3. The sliding door system of claim 1, wherein the second opening includes a seal.

4. The sliding door system of claim 1, wherein the terminal element is connected to the guide element.

5. The sliding door system of claim 4, wherein a connection between the terminal element and the guide element is pivotable.

6. The sliding door system of claim 1, wherein the terminal element is connected to the guide element via a connecting element.

7. The sliding door system of claim 1, wherein the power-conducting line emerges from one end of the power-conducting unit and extends from the terminal element to the retaining arm.

8. The sliding door system of claim 1, wherein the power-conducting unit is arranged in a guide device.

9. The sliding door system of claim 8, wherein the guide device includes an elongate guide housing in which two opposite longitudinal sides each guide outwardly facing sides of the links of the power-conducting unit.

10. The sliding door system of claim 9, wherein the guide device is connected releasably to the guide rail.

11. The sliding door system of claim 9, wherein the guide device is arranged at a distance from the guide rail.

12. The sliding door system of claim 8, wherein in the direction of movement of the guide element, the guide device defines a gap through which the connecting element extends.

13. The sliding door system of claim 12, wherein the gap includes a seal.

14. The sliding door system of claim 13, wherein the guide rail completely covers the gap of the guide device toward the vehicle exterior.

15. The sliding door system of claim 1, wherein the retaining arm is connected pivotably to the guide element.

16. The sliding door system of claim 1, wherein the terminal element is connected to the retaining arm.

17. The sliding door system of claim 1, wherein the terminal element is connected to the retaining arm via a connecting element.

\* \* \* \* \*